J. Y. Goode.
Well Auger.
N° 97501. Patented Dec. 7, 1869.

Witnesses: Inventor:

United States Patent Office.

J. Y. GOODE, OF WATER VALLEY, MISSISSIPPI.

Letters Patent No. 97,501, dated December 7, 1869.

IMPROVED WELL-AUGER.

The Schedule referred to in these Letters Patent and making part of the same.

*To all whom it may concern:*

Be it known that I, J. Y. GOODE, of Water Valley, in the county of Yalobusha, and State of Mississippi, have invented a new and useful Improvement in Well-Augers; and I do hereby declare that the following is a full, clear, and exact description thereof, which will enable others skilled in the art to make and use the same, reference being had to the accompanying drawings, forming part of this specification.

The object of this invention is to provide certain improvements in well-boring augers, calculated to make them work more easily, and to facilitate the withdrawal of them from the holes, as required from time to time, without increasing the resistance of atmospheric pressure, due to the vacuum commonly produced below.

Similar letters of reference indicate corresponding parts.

Figure 1:
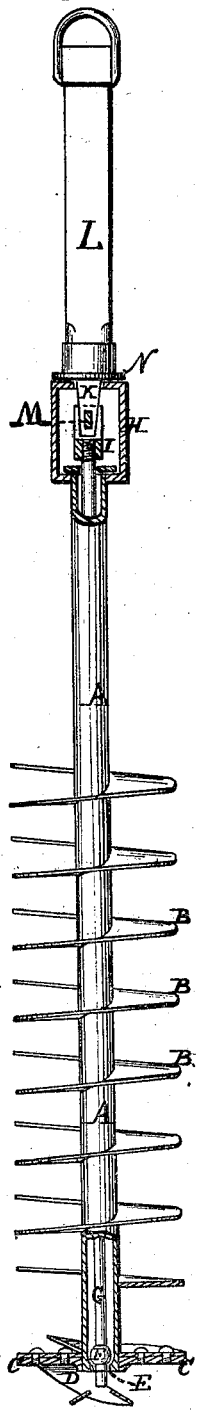
Figure 1 represents an elevation of my improved auger, partly in section.
Figure 2:
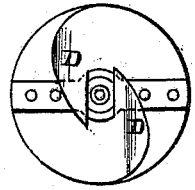
Figure 2 represents a plan of the bottom.

I make the shaft A of a hollow tube, and the spiral flanges B of thin metal, preferably steel, and in sections, and secure them to the shaft by brazing or other similar means.

At the lower or boring-end I secure a cross-bar, C, and connect thereto two spiral and pointed lips D, securing them by bolts or rivets, so that they may be readily removed when broken or worn.

These augers commonly have only one lip, which gives a lateral pressure, and the auger is not sure to work straight.

The lower end of the shaft A is provided with a valve-seat, as shown at E, and a valve, F, is fitted thereto, and connected to a rod, G, which extends the whole length of the tube, projecting into the yoke H, at the top.

Here a long nut, I, with a slot in the top, is screwed on, for the connection of the projection K of the working-rod L, by a transverse key, M.

Above the key M, a suitable distance, the working-rod is provided with a collar, N, which rests on the top of the yoke when boring, but, when raising out the auger, the rods L and G will be drawn up until the key strikes the under side of the top of the yoke.

When the collar N rests on the yoke, the valve F is pressed down upon its seat, preventing the entrance of anything into the tube from below, so that when the auger is to be withdrawn, and the valve raised from its seat by the act of withdrawal, the air will flow freely through the tube to the space below, and prevent the suction due to the vacuum which would otherwise be caused.

The sectional arrangement of the spirals tends to make the auger work more easily, as the lower end of each section acts as a bit to chop the earth and prevent it from packing between the flange, as is common when the same is continuous.

Having thus described my invention,

What I esteem to be of my invention, and desire to protect by Letters Patent, are the following improvements upon well-augers, viz:

1. A rod, G, attached to the actuating-stock at one end, extending through the tube, and provided, near its extremity, with a globe or valve, F, all as and for the purpose specified.

2. The combination of the yoke H, long nut I, (slotted at the top,) projection K, key M, and shoulder N, to regulate the exclusion or admission of air to the space below the auger, all as shown and described.

J. Y. GOODE.

Witnesses:
  W. C. WATSON,
  MOSES FOLTZ.